(12) United States Patent
Young et al.

(10) Patent No.: US 12,730,324 B1
(45) Date of Patent: Sep. 8, 2026

(54) LENS MOUNTING STRUCTURES FOR HEAD-MOUNTED DISPLAY SYSTEMS

(71) Applicant: Apple Inc., Cupertino, CA (US)

(72) Inventors: Austin S Young, San Mateo, CA (US); Yinjuan He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 704 days.

(21) Appl. No.: 17/730,006

(22) Filed: Apr. 26, 2022

Related U.S. Application Data

(60) Provisional application No. 63/186,999, filed on May 11, 2021.

(51) Int. Cl.

*G02B 27/01* (2006.01)
*G02C 9/00* (2006.01)
*G06F 1/16* (2006.01)

(52) U.S. Cl.

CPC ..... *G02B 27/0176* (2013.01); *G02B 27/0172* (2013.01); *G02C 9/00* (2013.01); *G06F 1/163* (2013.01); *G02B 2027/0118* (2013.01); *G02B 2027/0169* (2013.01); *G02B 2027/0178* (2013.01)

(58) Field of Classification Search

CPC ............ G02B 27/0176; G02B 27/0172; G02B 2027/0118; G02B 2027/0169; G02B 2027/0178; G02C 9/00; G06F 1/163

See application file for complete search history.

(56) References Cited

U.S. PATENT DOCUMENTS 6,945,648 B2 9/2005 Schindler et al.
8,467,133 B2 6/2013 Miller
8,964,298 B2 2/2015 Haddick et al.
9,057,826 B2 6/2015 Gupta et al.
9,753,286 B2 9/2017 Gao et al.
10,203,762 B2 2/2019 Bradski et al.
2012/0162549 A1* 6/2012 Gao ....................... G02B 6/003 359/651
2016/0033772 A1* 2/2016 Han ..................... H04N 1/6083 359/630
2017/0131545 A1* 5/2017 Wall ................... G02B 27/4205
2017/0351095 A1* 12/2017 Negrete ............. G02B 27/0172
2018/0307282 A1* 10/2018 Allin ......................... G06F 1/20
2019/0064430 A1* 2/2019 Groppo ................ G02B 6/0088
2019/0227321 A1* 7/2019 Lee .................... G02B 27/0101
2021/0132387 A1* 5/2021 Stevens ................ G02B 26/004

* cited by examiner

*Primary Examiner* — Sahlu Okebato

(74) *Attorney, Agent, or Firm* — Treyz Law Group, P.C.; David K. Cole

(57) ABSTRACT

A head-mounted device may have a display system that provides display images. The display images may be supplied to eye boxes for viewing by a user with waveguides that have output couplers. The waveguides may be supported by head-mounted support structures between front and rear lenses on the left of the device and between front and rear lenses on the right of the device. The front and rear lenses may be mounted to the head-mounted support structures using front-mounted and/or rear-mounted arrangements. Front-mounted lenses are installed into the head-mounted support structure from the front and may be supported on alignment shelves in the head-mounted support structure that have front-facing surfaces. Rear-mounted lenses are installed into the head-mounted support structure from the rear and may have alignment shelves in the head-mounted support structure that have rear-facing surfaces.

27 Claims, 17 Drawing Sheets

LENS MOUNTING STRUCTURES FOR HEAD-MOUNTED DISPLAY SYSTEMS

This application claims the benefit of provisional patent application No. 63/186,999, filed May 11, 2021, which is hereby incorporated by reference herein in its entirety.

FIELD

This relates generally to electronic devices, and, more particularly, to electronic devices such as head-mounted devices.

BACKGROUND

Electronic devices such as head-mounted devices may have optical elements such as lenses. Lenses may be housed in a head-mounted support structure.

SUMMARY

A head-mounted device may have a display system that provides display images. The display images may be supplied to eye boxes for viewing by a user. Waveguides with output couplers may be used to provide the display images to the eye boxes.

The waveguides may be supported by head-mounted support structures between front and rear lenses on the left of the device and between front and rear lenses on the right of the device. During operation, a user may view display images from the display system overlaid on real-world images viewed through the lenses.

The front and rear lenses may be mounted to the head-mounted support structures using front-mounted and/or rear-mounted arrangements. Front-mounted lenses may be supported on alignment shelves in the head-mounted support structure that have outwardly facing (front-facing) surfaces facing away from the eye boxes. Rear-mounted lenses may be supported on alignment shelves in the head-mounted support structure that have inwardly facing (rear-facing) surfaces facing towards the eye boxes.

Adjustable optical components may be included in the head-mounted device. For example, an electrically adjustable light modulator or other electrically adjustable layer may be attached to each front lens.

DETAILED DESCRIPTION

Electronic devices such as head-mounted devices may include optical elements such as lenses that are mounted in head-mounted support structures. Display systems such as systems with display devices coupled to waveguides with output couplers may be used to present a user with display images (sometimes referred to as computer-generated images or virtual images) as the head-mounted support structures are worn on the head of a user. The display images may be viewed from eye boxes.

A head-mounted device may be configured to allow a user to view the real world from the eye boxes. An optical system may be used to combine real-world images with display images. For example, an optical system may have lenses through which real-world objects are viewed. The waveguides of the display system form part of this optical system and may be sandwiched between front and rear lenses so that display images pass to eye boxes through the rear lenses. In this way, a head-mounted device may present a user with a mixture of display images and real-world images. Display images may, for example, be overlaid over real-world images.

The head-mounted support structures of a head-mounted device may have features that allow accurate assembly of components such as waveguides and other optical elements such as lenses. For example, a head-mounted support structure may have notches, registration structures, mounting surfaces, and/or other features that allow optical elements to be mounted in desired locations in the head-mounted support structure. This helps ensure that optical elements are aligned properly. If desired, the mounting techniques used in attaching lenses and other optical elements to the head-mounted support structures may permit rework or repair. For example, removable fasteners, adhesive that can be softened by heat, reversable attachment mechanisms may be used in mounting lenses to the support structures.

Figure 1:
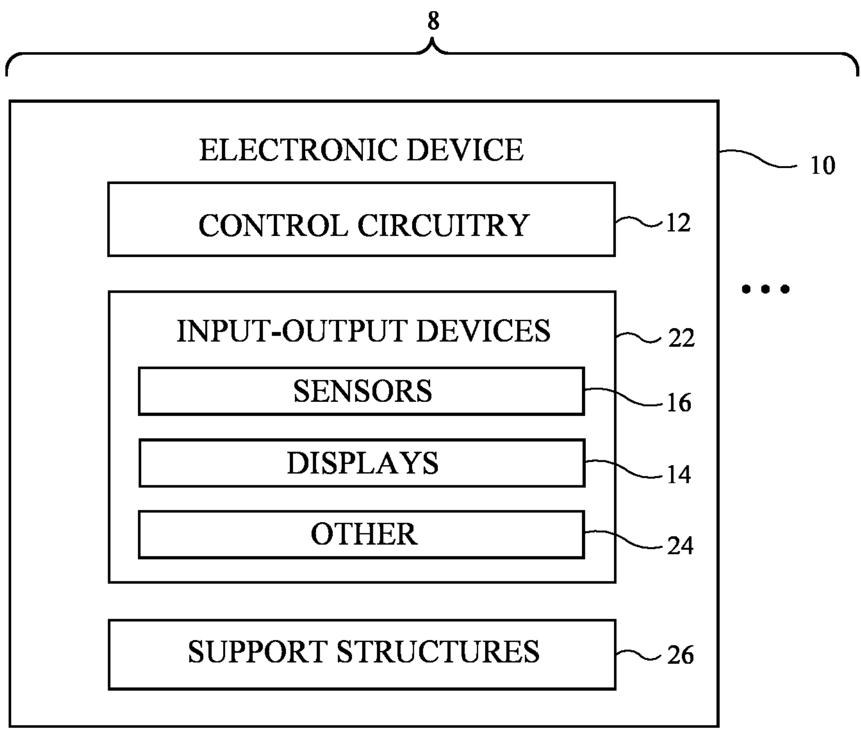
FIG. 1 is a schematic diagram of an illustrative electronic device such as a head-mounted display device in accordance with an embodiment.

A schematic diagram of an illustrative system that may include a head-mounted device is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi®circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as displays 14. In some configurations, device 10 includes left and right display devices (e.g., left and right components such as left and right scanning mirror display devices or other image projectors, liquid-crystal-on-silicon display devices, digital mirror devices, or other reflective display devices), left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively. Illustrative configurations in which device 10 has left and right display devices such as left and right displays that provide respective left and right display images for a user's left and right eyes through waveguides with output couplers may sometimes be described herein as an example.

During operation, control circuitry 12 uses displays 14 to provide visual content for a user of device 10. The content that is presented on displays 14 may sometimes be referred to as display image content, display images, computer-generated content, computer-generated images, virtual content, virtual images, or virtual objects.

Display images may be displayed in the absence of real-world content or may be combined with real-world images. In some configurations, real-world content may be captured by a camera (e.g., a forward-facing camera, sometimes referred to as a front-facing camera) so that computer-generated content may be electronically overlaid on portions of the real-world image (e.g., when device 10 is a pair of virtual reality goggles with an opaque display). In other configurations, which are described herein as an example, an optical combining system may be used to allow computer-generated content to be optically overlaid on top of a real-world image. With this approach, device 10 has an optical system that provides display images to a user through a waveguide having a holographic output coupler or other optical coupler while allowing the user to view real-world images through the waveguide and optical coupler. Illustrative arrangements for device 10 are described herein in which device 10 includes a display system having displays that generate images, waveguides that receive the images and that convey the images in front of eye boxes where the user's eyes are located, and output couplers (e.g., gratings, holograms, etc.) on the waveguides that couple the images out of the waveguides towards the eye boxes.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support displays 14, sensors 16, other components 24, other input-output devices 22, and control circuitry 12. Configurations in which device 10 has head-mounted support structures that form a frame for a pair of glasses (e.g., a glasses frame) are described herein as an example.

Figure 2:
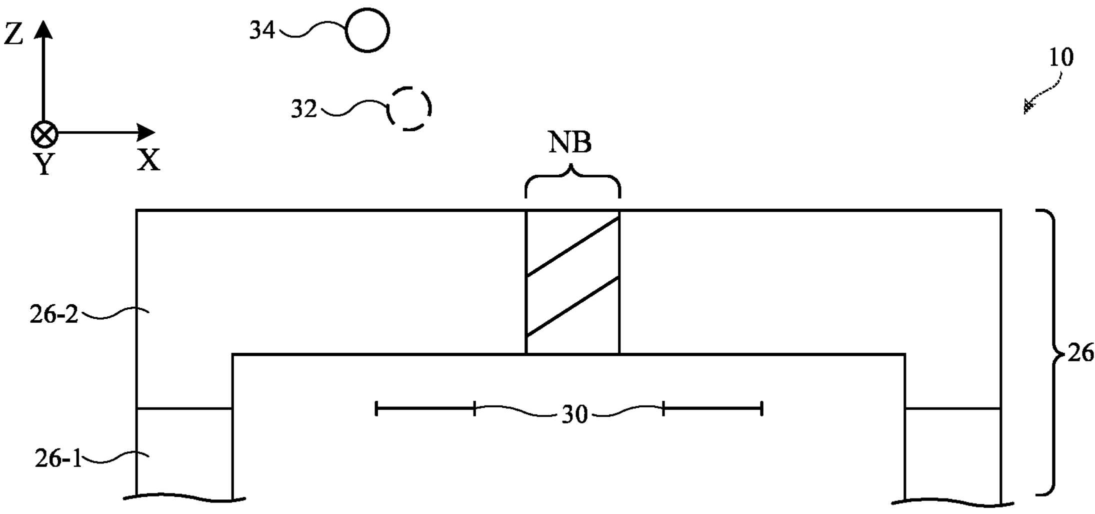
FIG. 2 is a top view of an illustrative head-mounted device in accordance with an embodiment.

FIG. 2 is a top view of electronic device 10 in an illustrative configuration in which electronic device 10 is a head-mounted device such as a pair of mixed-reality glasses. As shown in FIG. 2, electronic device 10 may include head-mounted support structure 26 to house the components of device 10 and to support device 10 on a user's head. Support structure 26 may include, for example, structures that form housing walls and other structures at the front of device 10 (e.g., support structures 26-2, which may form frame structures such as nose bridge NB, end pieces, rims for supporting lenses, and/or other housing structures) and additional structures such as straps, temples, or other supplemental support structures (e.g., support structures 26-1) that help to hold the main unit and the components in the main unit on a user's face so that the user's eyes are located within eye boxes 30.

During operation of device 10, images are presented to a user's eyes in eye boxes 30. Eye boxes 30 include a left eye box that receives a left image and a right eye box that receives a right image. Device 10 may include a left display system with a left display 14 that presents the left image to the left eye box and a right display system with a right display 14 that presents the right image to the right eye box. In an illustrative configuration, each display system may have an optical combiner assembly that helps combine display images (e.g., computer-generated image 32 of FIG. 2, sometimes referred to as a virtual image) with real-world images (e.g., light from real-world objects such as object 34 of FIG. 2). Optical combiner assemblies may, for example, include waveguides with output couplers formed from holograms. The waveguides may be formed from polymer layers that transport images internally in accordance with the principal of total internal reflection.

Displays 14 may, if desired, include display devices such as projectors. These displays may be mounted in nose bridge NB, at the outer left and right edges of structures 26-2, and/or in other portions of head-mounted support structures 26. Display images from the displays may be coupled into respective left and right waveguides (e.g., through prisms). The waveguides may be formed form transparent layers such as glass or polymer layers (plates, films, etc.) that extend across the front of device 10 and overlap left and right eye boxes 30, respectively. The waveguides may be supported by nose bridge NB, by frame rims in support structures 26-2, and/or using other portions of head-mounted support structures 26. Each waveguide may have an embedded output coupler and/or an output coupler that is laminated to the surface of the waveguide structure. Each output coupler may be formed from a hologram, grating, or other optical output coupler structure. During operation, display images from the displays that are coupled into the waveguides travel laterally across the front of device 10 within the waveguides (e.g., image light is guided within the waveguides in accordance with the principal of total internal reflection). When the guided image light reaches the output couplers, the output couplers couple the image light out of the waveguides towards eye boxes 30 for viewing.

Figure 3:
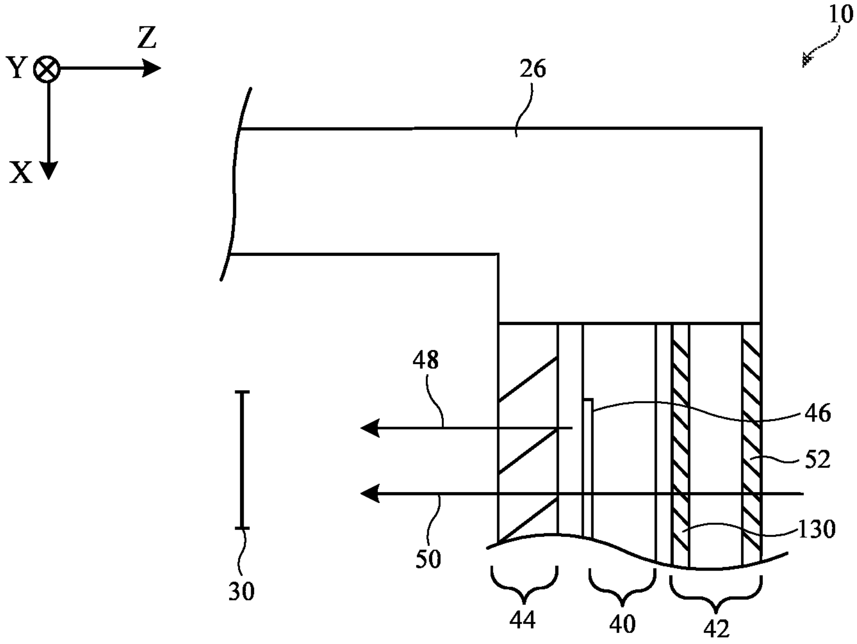
FIG. 3 is a top view of a portion of an illustrative head-mounted device in which optical elements are mounted to a head-mounted support structure in accordance with an embodiment.

A top cross-sectional view of a portion of an illustrative head-mounted device is shown in FIG. 3. As shown in FIG. 3, waveguide 40 may be mounted in head-mounted support structures 26 between an outer optical element such as outer lens 42 and an inner optical element such as inner lens 44 (e.g., so that there are air gaps separating lens 42 from waveguide 40 and separating lens 44 from waveguide 40). Waveguide 40 has a substrate such as a transparent layer of polymer or glass and has an associated output coupler 46 that couples guided display image light out of waveguide 40 towards eye box 30, as shown by display image light 48. Inner lens 44 may have a negative bias component and a user-specific eyeglass prescription component. Outer lens 42 may have a positive bias component that is equal and opposite to that of the negative bias component. As one example, outer lens 42 may have a +1 diopter bias component and inner lens 44 may have a −1 diopter bias component. When viewing real-world images from eye box 30, these two bias components cancel each other. If a user has a vision defect (e.g., nearsightedness or farsightedness), vision correction can be implemented by combining a user's prescription with the negative bias component of inner lens 44. Otherwise, inner lens 44 may include only the negative bias component.

Consider, as an example, a scenario in which a user is nearsighted and has a prescription dictating the use of −0.5 diopter of vision correction. In this situation, the vision correction component of lens 44 will be −0.5. When combined with the −1.0 diopter of the negative bias component, the lens power of inner lens 44 (in this example) will be −1.5 diopter.

Display images that have been coupled into waveguide 40 are coupled out of waveguide 40 towards eye box 30 by output coupler 46, as shown by display image light 48. The display images pass through the negative bias of inner lens 44, which places the display images at a desired virtual image distance. This virtual image distance is one meter in the illustrative situation where the negative bias of lens 44 is −1 diopter. The vision correction component of lens 44 (which is −0.5 diopter for the illustrative user in the present example) is used to correct for the user's nearsightedness. In general, the vision correction component of lens 44 may be used to correct for farsightedness, nearsightedness, astigmatism, etc.

The presence of a lens power in outer lens 42 that is equal and opposite to the negative bias component of lens 44 compensates for the presence of the negative bias lens power in inner lens 44 when a user is viewing real-world objects. This is because the +1 diopter bias of lens 42 and the −1.0 diopter bias of lens 44 cancel each other so no lens power is imposed on real-world image light 50 that passes through lens 42, waveguide 40, and lens 44 to eye box 30.

If desired, lenses such as lenses 42 and 44 may be customized for each user based on that user's interpupillary distance (e.g., the positions of the lens centers of left and right lenses 42 and the positions of the lens centers of left and right lens 44 may be selected to accommodate the center-to-center separation distance between the user's left and right eyes when lenses 42 and 44 are mounted in support structures 26). In this way, interpupillary distance variations between different users can be accommodated without changes to head-mounted support structures 26 and without using movable lens mounting structures to move the left and right lenses towards or away from each other.

Lenses such as lenses 42 and 44 may, if desired, include coatings. As shown in the illustrative configuration of FIG. 3, for example, outer lens 42 may have an outwardly facing (front-facing) coating such as coating 52. Coating 52 may be, for example, an antireflection coating and/or a coating that includes an antireflection layer, an antiscratch layer, and/or an antismudge layer (as examples). Antireflection coatings and/or other coatings such as coating 52 may be formed on any surfaces of the optical elements in device 10. The location of coating 52 on the outwardly facing surface of outer lens 42 of FIG. 3 is illustrative.

If desired, adjustable optical components may be incorporated into device 10. These adjustable optical components may include adjustable layers that are controlled by control signals from control circuitry 12. As an example, an electrically adjustable layer such as layer 130 may be formed on the inwardly facing surface of lens 42. Layer 130 may exhibit one or more adjustable optical properties such as adjustable transmission, adjustable reflection, adjustable absorption, adjustable polarization, adjustable haze, and/or adjustable color cast. In an illustrative configuration, layer 130 is an adjustable light modulator layer with an adjustable light transmission (e.g., an electrochromic layer, a guest-host liquid crystal layer, or other layer that exhibits an adjustable light transmission). Layer 130 may be used, as an example, to temporarily decrease light transmission of light 50 through lens 42 in bright ambient lighting conditions. This reduces scene brightness and thereby allows display image light 48 from waveguide 40 to be viewed at eye box 30 without being overwhelmed and thereby washed out by overly bright real-world image light 50.

Lenses such as lenses 42 and 44 are used together in device 10 and may therefore sometimes be referred to as forming lens elements in a common lens, may be referred to as optical elements, etc. Waveguide 40 may also sometimes be referred to as an optical element.

Satisfactory performance of device 10 may be ensured by accurately aligning the optical elements of device 10. As an example, lens performance may be enhanced by accurately aligning outer lens (front lens) 42 to inner lens (rear lens) 44 (e.g., in the X, Y, and Z dimensions).

To align lenses 42 and 44, head-mounted support structures 26 may be provided with alignment and mounting structures. These structures may include pin-and-hole registration structures and/or other registration structures, may include grooves, shelves (sometimes referred to as ledges, alignment and/or mounting structures, etc.), and/or other structures that have surfaces at known locations, and/or that have other structural elements that allow lenses 42 and 44 to be mounted in known locations relative to structures 26. In this way, proper alignment of lenses 42 and 44 relative to each other and relative to structures 26 (and therefore relative to waveguides 44 which are supported by structures 26) may be ensured.

Figure 4:
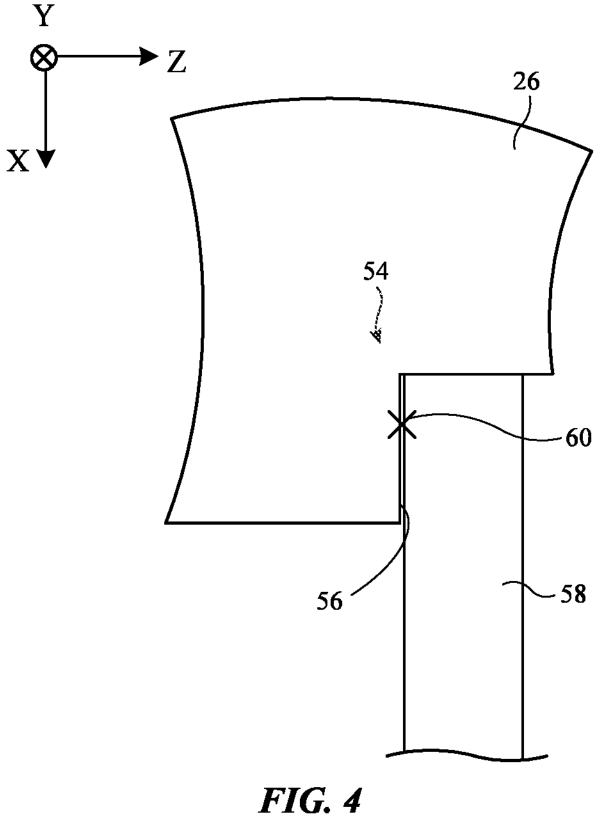
FIGS. 4 and 5 are cross-sectional views of illustrative head-mounted support structures and optical elements in accordance with embodiments.

An illustrative alignment structure based on a shelf (e.g., a ledge or other structure with a mounting surface at a desired location) is shown in FIG. 4. In the example of FIG. 4, structures 26 have been configured so that optical element 58 is installed into structures 26 from the front. As shown in the cross-sectional side view of the portion of device 10 of FIG. 4, structures 26 may have an outwardly facing shelf such as shelf 54 with an outwardly facing surface (front-facing surface) such as outwardly facing surface 56. Optical element 58 (e.g., a lens element such as lens 44 or a lens element such as lens 42) may be mounted to shelf 54 from the front using attachment structure 60. Structure 60 may be a fastener (e.g., at a threaded fastener such as a screw, bolt, and/or other mechanical fastener), adhesive (e.g., a reworkable adhesive that may be softened when rework or repair is required by heating the adhesive), a structure for forming a press-fit connection, a structure with engagement features (e.g., mating structures such as protrusions and mating recesses), etc. Adhesive for forming structure 60 may include thermoset and/or thermoplastic polymer adhesive. As examples, adhesive for structure 60 may include a layer of pressure sensitive adhesive, a layer of optically clear adhesive (e.g., adhesive that is dispensed in liquid form and cured by application of heat and/or light), a layer of hot melt glue (e.g., a layer of adhesive that is dispensed in heated liquid form and that subsequently solidifies when cooled), etc.

Figure 5:
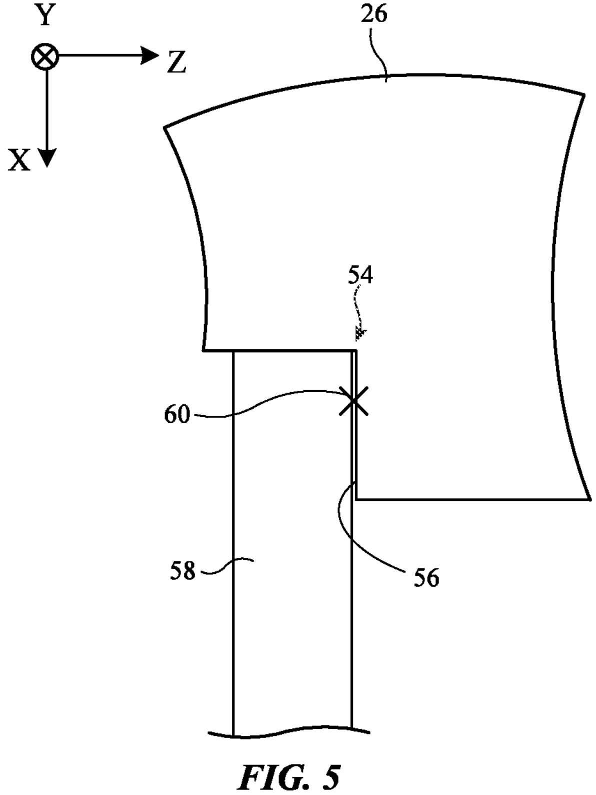

If desired, structures 26 may include one or more alignment structures based on inwardly facing shelves or other structures that allow a lens or other optical component to be installed into structures 26 from the rear. As shown in FIG. 5, for example, structures 26 may include inwardly facing shelf 54, which has an inwardly facing shelf surface (alignment surface) 56 to which optical element 58 may be attached using adhesive or other attachment structure 60.

When structures 26 are configured to include an outwardly facing shelf or are otherwise configured to allow a lens or other optical element to be installed in structures 26 from the front, an optical element may be mounted into device 10 from the front and may therefore sometimes be referred to as a front-mounted optical element (e.g., a front-mounted lens). When structures 26 are configured to include an inwardly facing shelf or are otherwise configured to allow an optical element to be installed in structures 26 from the rear, an optical element may be mounted in device 10 from the rear and may therefore sometimes be referred to as a rear-mounted optical element (e.g., a rear-mounted lens).

In general, outwardly facing (front) lenses and inwardly facing (rear) lenses may be front mounted and/or may be rear mounted.

An outwardly facing shelf will help prevent a front-mounted lens or other optical element from being forced inwardly towards eye boxes 30 in the event of an automobile accidence or other undesired impact event that places excessive stress on device 10. Inwardly facing shelves allow optical elements to be mounted into device 10 from the rear and to be removed from the rear, which may facilitated rework or repair from the rear. The use of rear-mounted rear lenses may also help these lenses resist pressure during lens cleaning by a user (e.g., when a user squeezes a front-mounted front lens and rear-mounted rear lens between the user's fingers during lens cleaning).

Rear-mounted optical elements may include rear-mounted front lenses and/or rear-mounted rear lenses. In general, structures 26 may include any suitable combination of alignment structures allowing inward mounting and/or outward mounting. For example, the left and right sides of device 10 may each include a front-mounted front lens and a front-mounted rear lens, may each include a front-mounted front lens and a rear-mounted rear lens, or may each include a rear-mounted rear lens and rear-mounted front lens.

Figure 6:
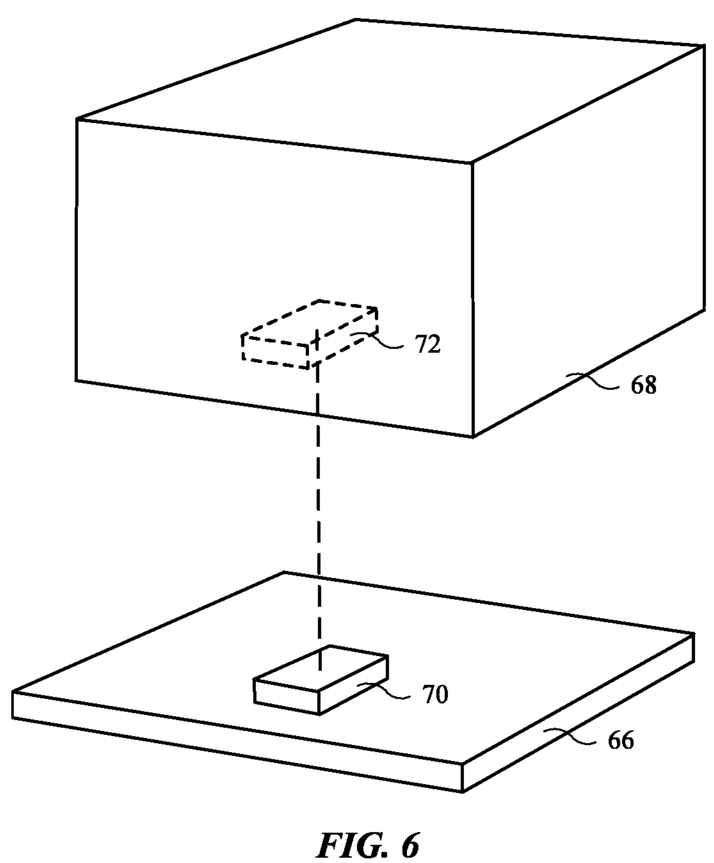
FIG. 6 is an exploded perspective view of illustrative mating registration structures for mounting optical elements in a head-mounted device in accordance with an embodiment.

As shown by the exploded perspective view of illustrative structures 66 and 68 of FIG. 6, structures in device 10 (e.g., structures 26, optical elements such as lenses 42 and 44, etc.) may be mounted to each other using registration structures such as registration feature 70 (e.g., a registration pin or other registration protrusion, sometimes referred to as a boss) and mating registration structures such as mating registration feature 72 (e.g., a registration hole or other registration recess configured to receive the registration protrusion and thereby align structures 66 and 68 to each other). Registration structures may, as an example, be formed from recesses and/or protrusion in a lens (e.g., lens 42 and/or lens 44) and mating structures (e.g., recesses and/or protrusions in a metal bracket or other structure that forms part of structures 26).

Figure 7:
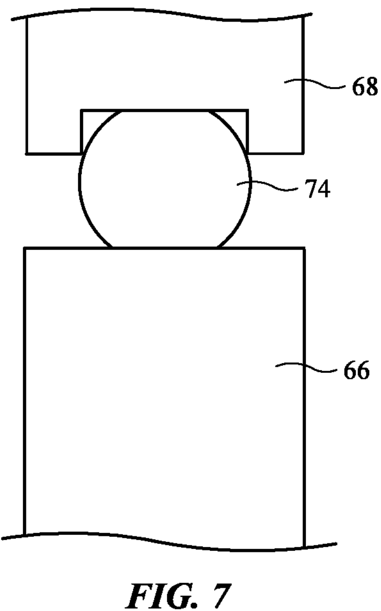
FIG. 7 is a cross-sectional view of an illustrative O-ring mounting arrangement for mounting an optical element in a head-mounted device in accordance with an embodiment.

The alignment and/or mounting of structures 66 and 68 may also be facilitated using O-rings as shown by the illustrative O-ring mounting arrangement of FIG. 7 in which O-ring 74 is used to form a connection between illustrative structures 66 and 68 of FIG. 7. O-ring connections may help align structures in device 10 to each other and may also help form environmental seals. As an example, an O-ring may run along the perimeter of a lens to form a seal between the outer edge of the lens and the opposing inner edge of a lens rim or other mounting structure in structures 26.

Figure 8:
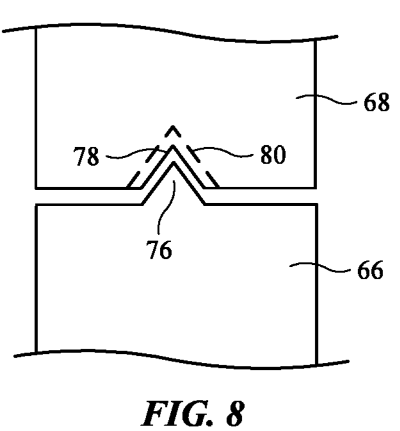
FIG. 8 is a cross-sectional view of an illustrative head-mounted support structure and optical element with mating registration structures in accordance with an embodiment.

If desired, structures 26 and optical elements such as lenses 42 and 44 may be provided with reworkable mechanical attachment structures such as structures that support press-fit and/or snap-fit connections. An illustrative snap-fit connection formed by protrusion 76 on structure 66 and corresponding recess 78 on structure 68 is shown in FIG. 8. Protrusion 76 may be a ring-shaped ridge with a triangular cross-sectional profile or other suitable cross-sectional shape. Recess 78 may be a ring-shaped groove with a mating profile such as a triangular cross-sectional profile or other cross-sectional shape. In an illustrative configuration, structure 66 of FIG. 8 is a lens and structure 68 of FIG. 8 is a portion of structure 26 that has a lens-shaped opening facing towards the lens. Optional adhesive 80 (e.g., hot-melt adhesive and/or other adhesive) may be placed in recess 78 to help hold structures 66 and 68 together. Arrangements in which co-molded polymer (e.g., elastomeric O-ring polymer material) is formed over protrusion 76 and/or in recess 78 to help form a seal where protrusion 76 and recess 78 mate with each other may also be used, if desired.

Figure 9:
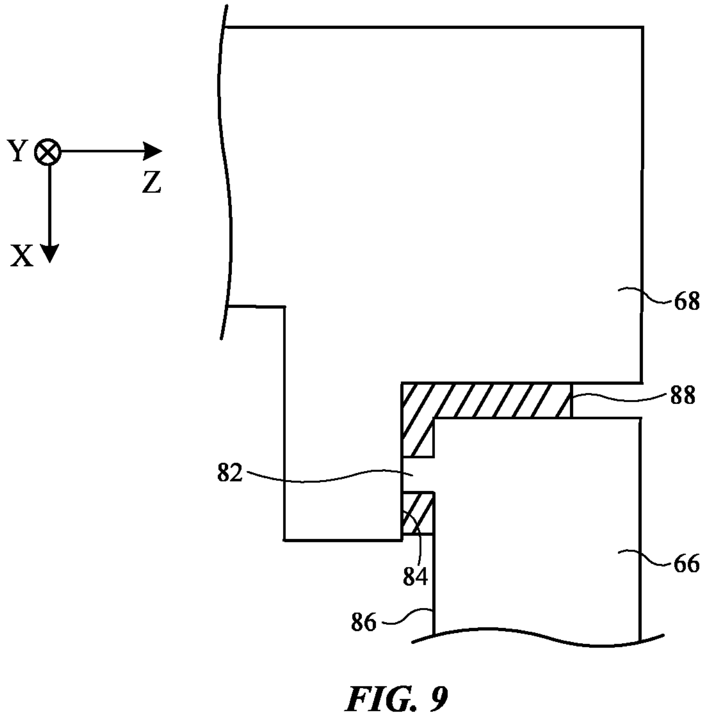
FIG. 9 is a cross-sectional view of an illustrative optical element mounted to a support structure with adhesive in accordance with an embodiment.

As shown in the example of FIG. 9, alignment, mounting, and sealing functions may be achieved using a liquid adhesive joint between structures 66 and 68. Structure 66 may be, for example, a lens such as lens 42 and/or lens 44 that has one or more bump stop structures such as bump stop 82 (e.g., a protrusion for ensuring a desired adhesive joint thickness). Bump stop 82 may serve to establish a desired thickness for the gap between surface 86 of structure 66 and opposing surface 84 of structure 68. Structure 68 may be, for example, a portion of structures 26 that is configured to form a mounting and alignment structure for structure 66. Adhesive 88 (e.g., hot melt adhesive, optically and/or thermally cured liquid adhesive, and/or other adhesive) may be dispensed in liquid form and solidified (e.g., by cooling, curing, etc.) to form an adhesive joint between structures 66 and 68. Adhesive 88 may, as an example, form a ring-shaped bond between structures 66 and 68 around the perimeter of structures 66. The desired thickness of adhesive 88 may be ensured by controlling the gap thickness between surfaces 66 and 86 using bump top 82.

Figure 10:
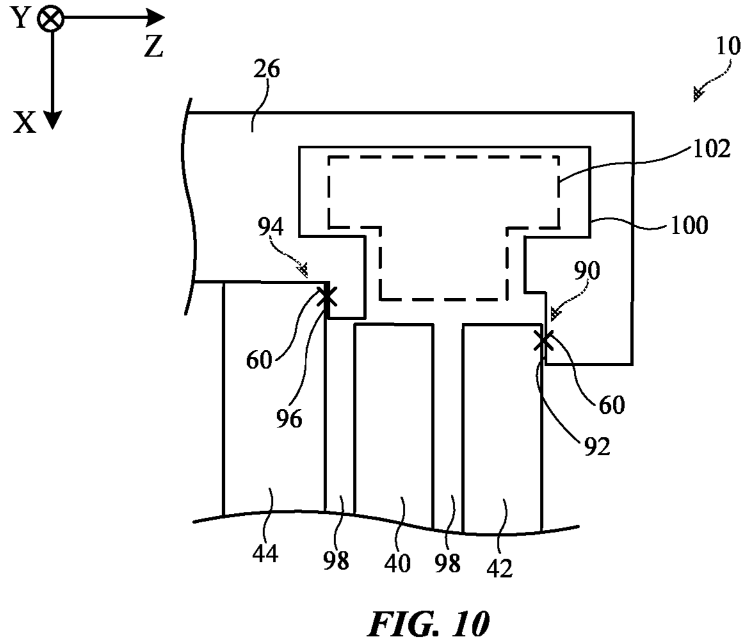
FIGS. 10, 11, and 12 are cross-sectional views of illustrative mounting arrangements for optical elements in head-mounted devices in accordance with embodiments.

FIG. 10 is a cross-sectional side view of a portion of structures 26 in an illustrative configuration in which device 10 has two rear-facing lens mounting shelves. This permits front lens 42 and rear lens 42 to be rear mounted. Shelf 90 has rear-facing surface 92 against which a front lens such as lens 42 is mounted with attachment structures 60 and shelf 94 has rear-facing surface 96 against which a rear lens such as lens 44 is mounted with attachment structures 60. Air gaps 98 may be present between the lenses and waveguide 40. For example, the rear surface of lens 42 may be separated by an air gap from the outwardly facing (front facing) front surface of waveguide 40 and the front surface of lens 44 may be separated by an air gap from the inwardly facing (rear facing) rear surface of waveguide 40.

Structures 26 may have interior regions formed from cavities such as cavity 100. Interior region 102 in cavity 100 of structures 26 may contain structural support members (e.g., metal members), may contain wires, may contain flexible printed circuits and other substrates with conductive paths formed from metal traces, and/or may have other signal paths, circuitry (e.g., the components of device 10 of FIG. 1), structural elements, etc. Cavities such as cavity 100 may be confined to the left and right front portions of structures 26, may extend in a ring around lenses 42 and 44, and/or may be formed in other portions of structures 26.

Figure 11:
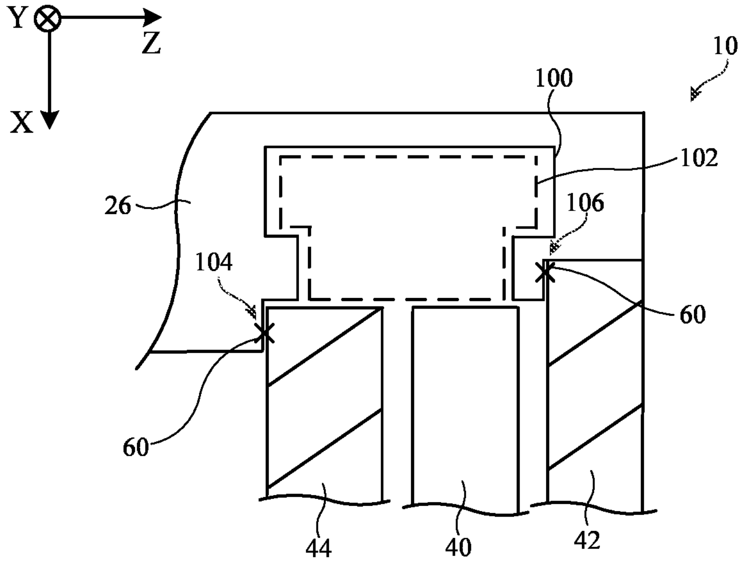
Figure 12:
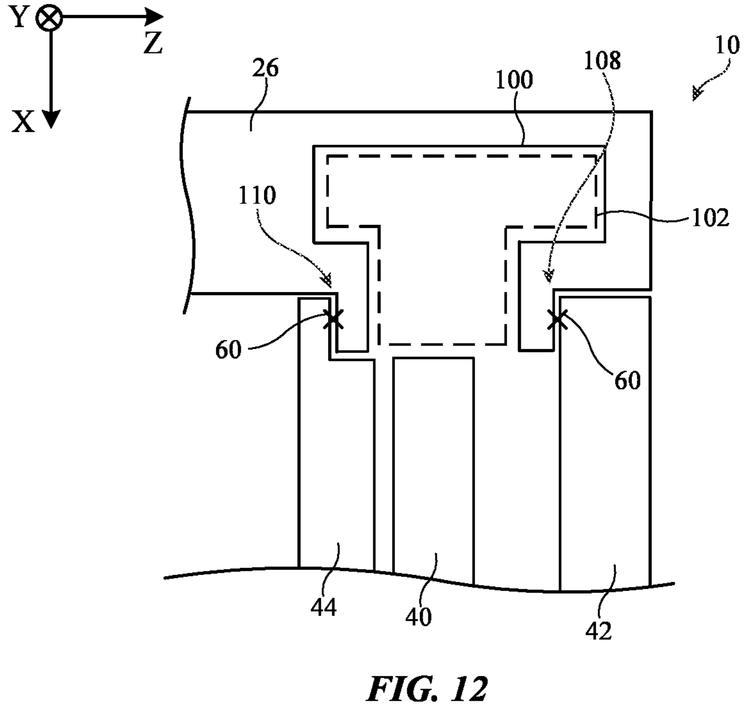

In the example of FIG. 10, both mounting shelves in structures 26 face rearwardly. If desired, device 10 may have a pair of front facing shelves such as outwardly facing shelf 104 and outwardly facing shelf 106 of FIG. 11 to allow lenses 42 and 44 to be front mounted. Lenses 42 and 44 are mounted against the front facing surfaces of these shelves using attachment structures 60. If desired, structures 26 may be configured to provide both inwardly and outwardly facing mounting surfaces for lenses 42 and 44. As shown in FIG. 12, for example, outwardly facing shelf 108 may be used to mount front lens 42 (e.g., lens 42 of FIG. 12 may be a front-mounted front lens) and inwardly facing shelf 110 may be used to mount rear lens 44 (e.g., lens 44 of FIG. 12 may be a rear-mounted rear lens).

Figure 13:
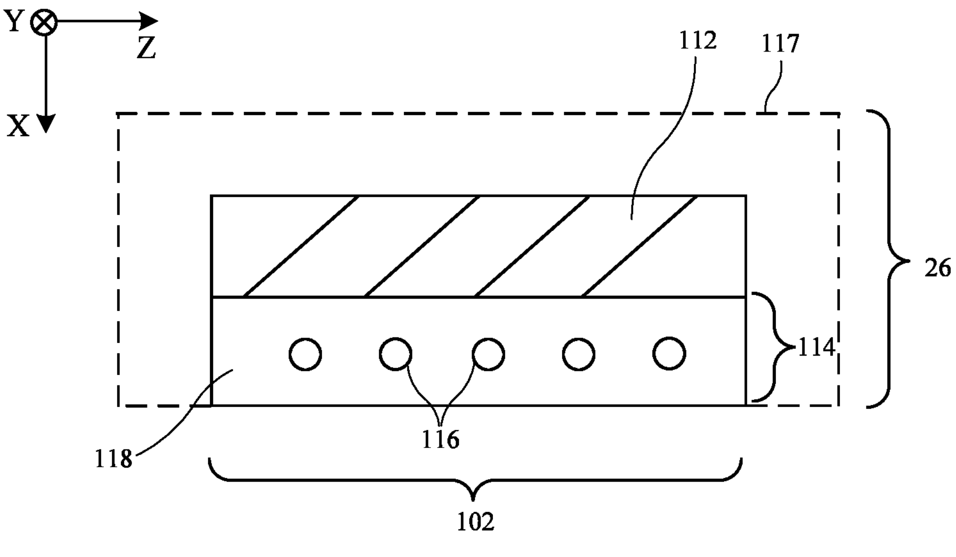
FIG. 13 is a cross-sectional view of illustrative support and electrical connection structures for a head-mounted device in accordance with an embodiment.

FIG. 13 shows illustrative structures that may be included in some or all of region 102. In the example of FIG. 13, region 102 contains structural member 112 and encapsulated circuitry 114. Structural member 112 may be, for example, a metal member such as a metal frame member having a ring-shaped opening(s) surrounding lenses 42 and 44 or other structural metal portion of structures 26. Structures 26 may, if desired, include a polymer structure such as polymer shell 117 to enclose some or all of member 112 and to form other portions of the head-mounted housing for device 10. Circuitry 114 may include signal lines such as wires and/or flexible printed circuits, integrated circuits, and other components embedded in encapsulant structures such as polymer 118 (see, e.g., wires 116).

Figure 14:
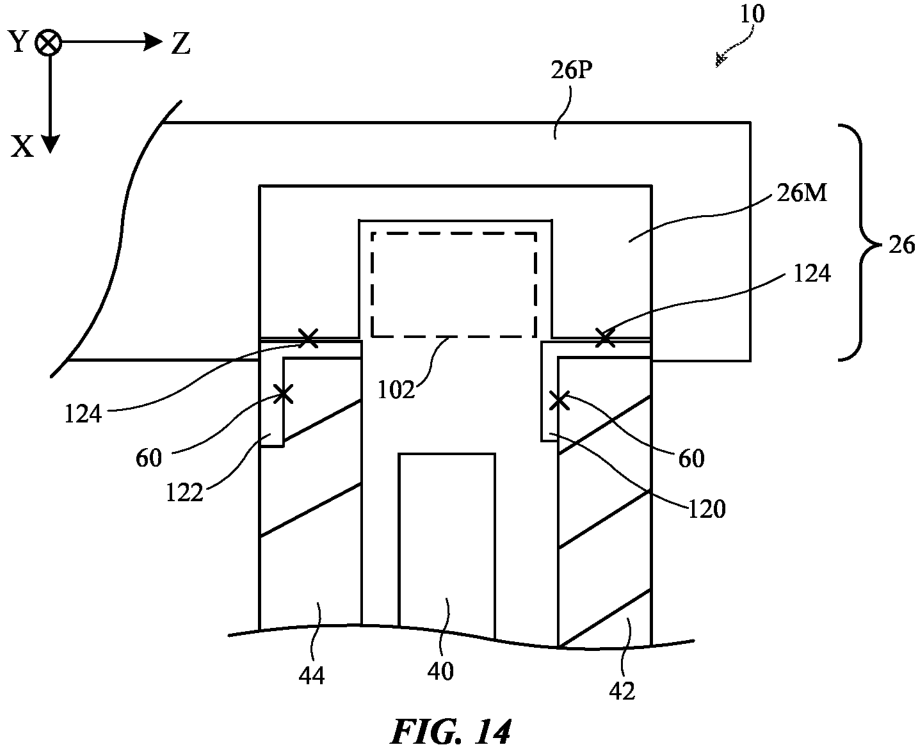
FIGS. 14, 15, and 16 are cross-sectional views of illustrative bracket-based mounting arrangements for mounting optical elements in a head-mounted device in accordance with embodiments.
Figure 15:
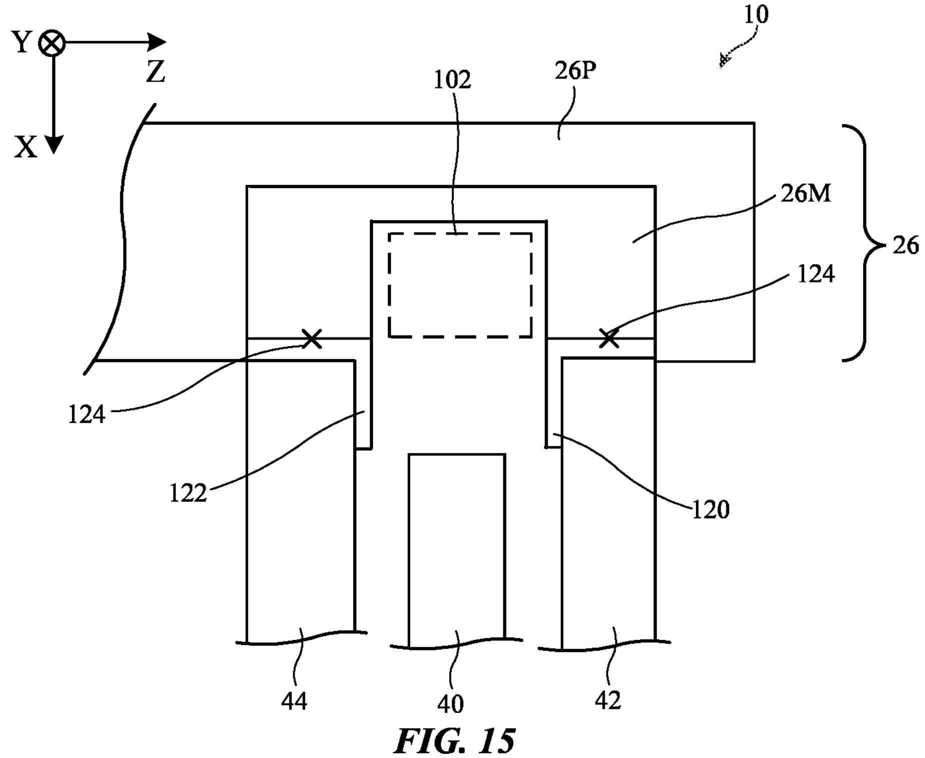

Metal structures such as metal brackets may form alignment shelves and/or other portions of structures 26. Consider, as an example, the arrangement of FIG. 14. As shown in FIG. 14, structures 26 may include metal member 26M. Metal member 26M may be configured to form interior region 102. Optional covering material such as polymer shell 26P may cover some or all of member 26M (e.g., to form a desired exterior surface for structures 26). Wires and other circuitry may be mounted in region 102 (e.g., embedded in optional polymer). Metal brackets 120 and 124 may be attached to member 26M using connections 124 (e.g., welds, connections formed using threaded fasteners, adhesive joints, solder, etc.). Bracket 120 may have a ring shape or other suitable shape and may be configured to form an outwardly facing shelf with a front surface against which the rear surface of front lens 42 is attached in a front-mounted arrangement using adhesive or other structures 60. Bracket 122, which may have a ring shape or other suitable shape, may form an outwardly facing shelf with a front surface against which the rear surface of lens 44 is attached in a front-mounted arrangement using adhesive or other structures 60. In this arrangement, both alignment and mounting shelves face towards the front of device 10. Arrangements with rear-facing mounting structures or both front-facing and rear-facing structures may be used. In the example of FIG. 15, front bracket 120 faces outwardly (in the +Z direction) and rear bracket 122 faces inwardly (in the −Z direction). In the FIG. 15 arrangement, lens 42 is a front-mounted front lens and lens 44 is a rear-mounted rear lens.

Figure 16:
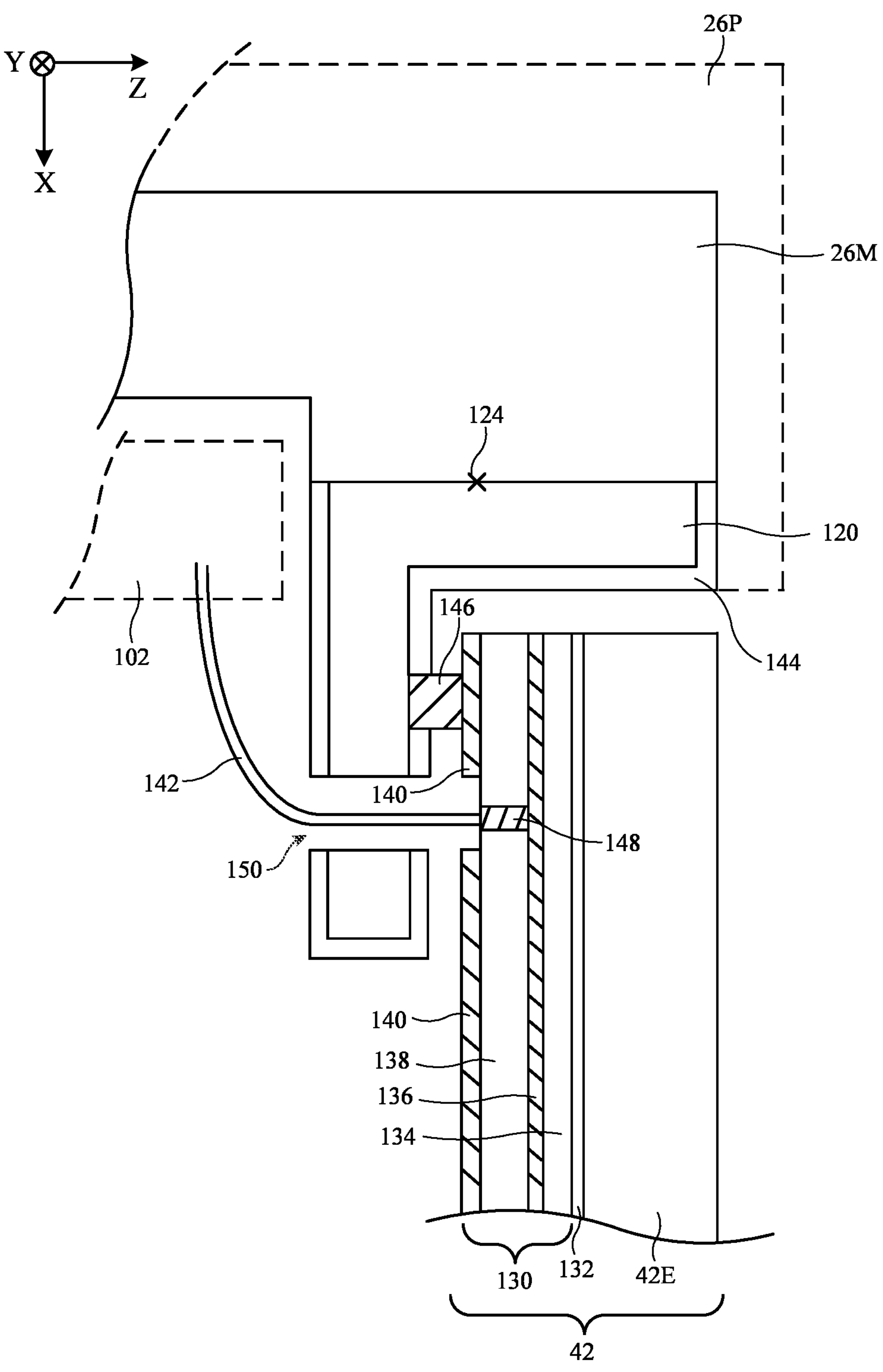

Signal paths formed from wires and/or other circuitry may be accommodated by brackets 122 and/or 120. Consider, as an example, bracket 120 of FIG. 16, which may be used in routing control signals to adjustable optical layer 130. As shown in FIG. 16, lens 42 may include lens element 42E (e.g., a lens with a desired lens power) and adjustable optical layer 130.

Adjustable optical layer 130 may have a substrate such as glass layer 134. Layer 130 may be attached to the inner surface of lens element 42E by adhesive layer 132. Adjustable optical layer 130 may have a first transparent electrode such as electrode 136 and a second transparent electrode such as electrode 140 and may have adjustable optical material 138 (e.g., electrochromic material, guest-host liquid crystal material, etc.) sandwiched between electrodes 136 and 140. Control circuitry 12, which may include wires and other circuitry in region 102 may be used to adjust the electric field across layer 138 and therefore the light transmission (or other adjustable optical property) of layer 130 by applying control signals to electrodes 136 and 140.

In the example of FIG. 16, a first control path (e.g., a path for applying a ground voltage) is formed between control circuitry and/or other circuitry in region 102 and electrode 140 of layer 130. The first control path passes through metal member 26M, through metal bracket 120 (which is connected to member 26M by a weld or other electrical and/or mechanical connection such as connection 124), and through conductive connection 146 (e.g., a solder joint or conductive adhesive bond). A second conductive path (e.g., a path for applying a control voltage) is formed between the control circuitry in region 102 and electrode 136 of layer 130. The second conductive path passes through cable 142 and through conductive via 148 in layer 130. Cable (wire) 142 may pass through opening 150 in bracket 120. The exterior of bracket 120 that is not directly contacting metal member 26M may, if desired be covered with insulation 144 (e.g., a dielectric coating such as a polymer coating).

Figure 17:
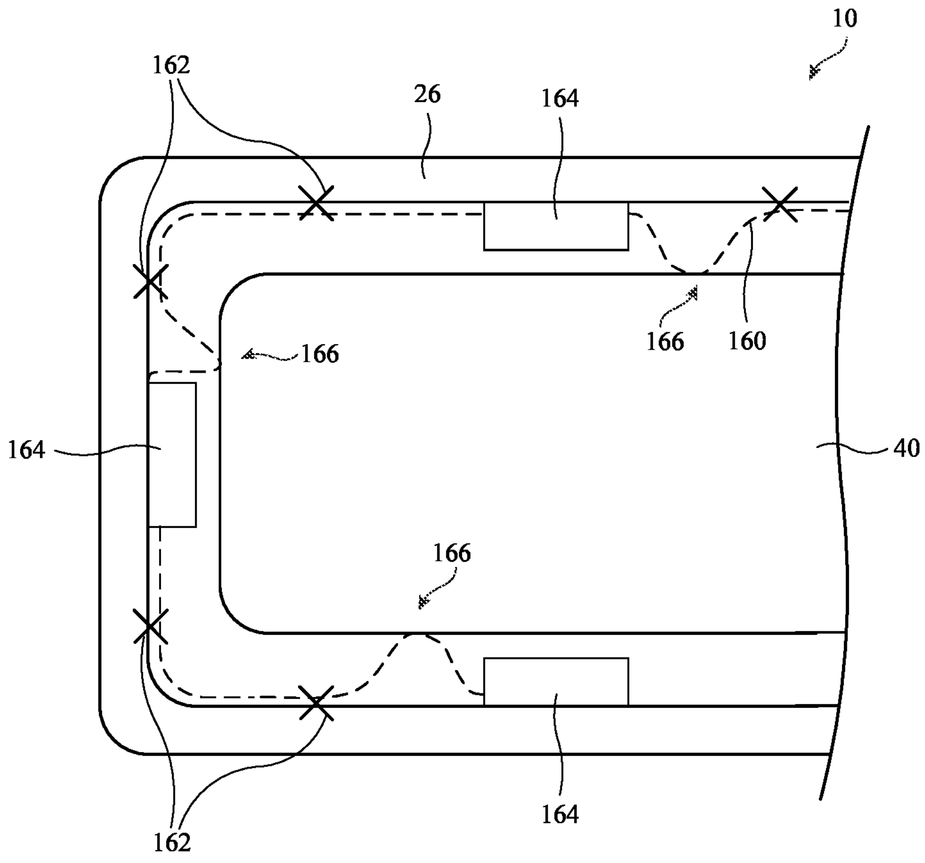
FIG. 17 is front view of an illustrative head-mounted device with waveguide mounting structures in accordance with an embodiment.

As described in connection with FIG. 3, waveguide 40 may be mounted in head-mounted support structures 26 between an outer optical element such as outer lens 42 and an inner optical element such as inner lens 44. FIG. 17 is a front view of an illustrative portion of device 10 with lenses 42 and 44 removed. As shown in FIG. 17, waveguide 40 may be mounted within support structures 26 using a spring member such as spring 160. Spring 160 may be formed from a bent strip of metal (e.g., spring metal) that is formed into a desired shape using stamping, welding, and/or other fabrication techniques. There may be a pair of springs 160 in device 10. Each spring 160 may form a C-shaped flexure structure on a respective side of device 10. Each spring 160 may run around the inner surface of a lens-shaped opening in support structures 26 and may bear against the opposing outer periphery of waveguide 40 in that lens-shaped opening. Glue joints 162 or other attachment mechanisms may be used to attach springs 160 to support structures 26.

The spring 160 on each side of device 10 may be bent so that three (or more) different spring contact points bear inwardly against the outer periphery of the portion of waveguide 40 on that side of device 10, as shown by the three points of contact between spring 160 and waveguide 40 at locations 166 of FIG. 17. This arrangement holds waveguide 40 in place at its perimeter while providing damping during a drop event, bending event, or other event that creates undesired amounts of force on structure 26. Optional bumpers 164 (e.g., polymer bumpers that are formed as integral portions of a frame or that are attached to a frame) may be used to help limit displacement of waveguide 40 (e.g., bumpers 164 may prevent excess movement of waveguide 40 within the opening in structures 26 during a drop event or other event in which excess force is applied to device 10).

If desired, other waveguide mounting structures such as three-point mounting structures based on pins, pegs, bump stops, etc. may be used to establish a planar datum on a face of waveguide 40. This type of approach may be used to attach waveguide 40 to structures 26 in a desired orientation. In general, C-ring spring mounting arrangements and/or other spring mounting schemes may be used in combination with three-point mounting arrangements or may be used instead of three-point mounting arrangements. The use of C-ring spring mounting in the absence of three-point waveguide mounting structures is described as an example.

Although sometimes described in the context of a head-mounted device that has left and right lenses, device 10 may, if desired, have only a left lens or only a right lens. The left and right lenses in device 10 may also be configured different from each other. For example, the left and right rear lenses may have different vision correction components when used by users with different vision correction needs in their left and right eyes.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:

a display system configured to produce a display image, wherein the display system includes a waveguide with an output coupler;

a head-mounted support structure comprising a metal bracket that forms a front-facing surface of the head-mounted support structure;

a front lens mounted on the metal bracket at the front-facing surface of the head-mounted support structure, wherein the front lens has a positive bias component, and there is a first air gap between the front lens and the waveguide; and a rear lens mounted to the head-mounted support structure, wherein the waveguide is located between the rear lens and the front lens and is configured to provide the display image to an eye box through the rear lens, the rear lens has a lens power with a negative bias component, and there is a second air gap between the rear lens and the waveguide.

2. The head-mounted device defined in claim 1 wherein:

the rear lens further has a vision correction component;

the front lens is attached to the front-facing surface with adhesive; and the front lens has an electrically adjustable light modulator layer.

3. The head-mounted device defined in claim 2 wherein the head-mounted support structure comprises an additional metal bracket forming a rear-facing surface that faces the eye box and wherein the rear lens is attached to the rear-facing surface with adhesive.

4. The head-mounted device defined in claim 1 wherein the rear lens is attached to a rear-facing surface of the head-mounted support structure.

5. The head-mounted device defined in claim 1 further comprising a light modulator layer on a rear-facing surface of the front lens.

6. The head-mounted device defined in claim 1 wherein the head-mounted support structure comprises a metal member with a polymer shell.

7. The head-mounted device defined in claim 1 wherein the head-mounted support structure is configured to form a cavity, the head-mounted device further comprising wires embedded in polymer within the cavity.

8. The head-mounted device defined in claim 7 further comprising an electrically adjustable layer on the front lens, wherein the wires are configured to supply a control signal to the electrically adjustable layer.

9. The head-mounted device defined in claim 7 further comprising a metal member in the cavity, wherein the polymer is attached to the metal member.

10. The head-mounted device defined in claim 1 wherein the head-mounted device comprises a metal frame member, the metal bracket is a front bracket attached to the metal frame member that forms the front-facing surface, and a rear bracket is attached to the metal frame member forming a rear-facing surface.

11. The head-mounted device defined in claim 10 wherein the rear lens is attached to the rear-facing surface with adhesive.

12. The head-mounted device defined in claim 1 further comprising an O-ring configured to form a seal around a selected one of the front lens and the rear lens.

13. The head-mounted device defined in claim 1 further comprising hot-melt adhesive configured to attach a selected one of the front lens and the rear lens to the head-mounted support structure.

14. The head-mounted device defined in claim 1 wherein the metal bracket has an opening, wherein the head-mounted support structure has a cavity that includes wires, wherein one of the wires passes through the opening, wherein the front lens has an adjustable light modulator with electrodes, and wherein the wire that passes through the opening contacts one of the electrodes.

15. The head-mounted device defined in claim 1 wherein the rear lens is attached to an additional front-facing surface of the head-mounted support structure.

16. The head-mounted device defined in claim 1 further comprising a spring that is configured to hold the waveguide within the head-mounted support structure.

17. The head-mounted device defined in claim 16 wherein the waveguide has a left side and wherein the spring is configured to bear inwardly against the waveguide at three points along a peripheral edge of the left side of the waveguide.

18. The head-mounted device defined in claim 17 further comprising bumpers that face inwardly towards the peripheral edge from the head-mounted support structure and that limit displacement of the waveguide relative to the head-mounted support structure during a drop event.

19. The head-mounted device defined in claim 16 wherein the spring comprises a strip of metal configured to form a flexure structure that holds the waveguide while providing damping during a drop event.

20. A head-mounted device, comprising:

a display system configured to produce a display image, wherein the display system includes a waveguide with an output coupler;

a head-mounted support structure comprising a mating recess;

a front-mounted front lens attached to the head-mounted support structure, wherein the front-mounted front lens includes an optical element that has a protrusion configured to engage the mating recess;

adhesive between the protrusion and the mating recess; and a rear-mounted rear lens attached to the head-mounted support structure, wherein the waveguide is located between the rear-mounted rear lens and the front-mounted front lens and is separated from the front-mounted front lens and rear-mounted rear lens by respective first and second air gaps.

21. The head-mounted device defined in claim 20 wherein the front-mounted front lens has a positive lens power and wherein the rear-mounted rear lens has a lens power with a negative lens power contribution that cancels the positive lens power and has a vision correction contribution.

22. The head-mounted device defined in claim 20 wherein the head-mounted support structure has a front shelf that forms a front-facing surface attached to the front-mounted front lens with adhesive and wherein the head-mounted support structure has a rear shelf that forms a rear-facing surface attached to the rear-mounted rear lens with adhesive.

23. The head-mounted device defined in claim 22 wherein the front shelf comprises a front metal bracket and wherein the rear shelf comprises a rear metal bracket.

24. The head-mounted device defined in claim 20 further comprising a C-shaped flexure structure interposed between the head-mounted support structure and the waveguide.

25. A head-mounted device, comprising:

a display system configured to produce a display image, wherein the display system includes a waveguide with an output coupler;

a head-mounted support structure comprising a front shelf that forms a front-facing surface that faces a first direction and a rear shelf that forms a rear-facing surface that faces a second direction that is opposite the first direction;

a front-mounted front lens attached to the front shelf of the head-mounted support structure with adhesive; and a front-mounted rear lens attached to the rear shelf of the head-mounted support structure with adhesive, wherein the waveguide is located between the front-mounted rear lens and the front-mounted front lens and is separated from the front-mounted front lens and front-mounted rear lens by respective first and second air gaps.

26. The head-mounted device defined in claim 25 wherein:

the front-mounted front lens has a positive lens power; and the front-mounted rear lens has a lens power with a negative lens power contribution that cancels the positive lens power and has a vision correction contribution.

27. The head-mounted device defined in claim 25 further comprising a metal spring that bears inwardly against a peripheral edge of the waveguide to hold the waveguide in place relative to the head-mounted support structure.

* * * * *